United States Patent

Niimi et al.

[11] Patent Number: 5,880,431
[45] Date of Patent: Mar. 9, 1999

[54] PREHEATING DEVICE OF ILLUMINATING UNIT FOR VEHICLE

[75] Inventors: Hiroshi Niimi, Chita-gun; Yukihide Shibata, Kariya, both of Japan

[73] Assignee: Nippondenso Co., Ltd., Kariya, Japan

[21] Appl. No.: 682,289

[22] Filed: Jul. 17, 1996

[30] Foreign Application Priority Data

Aug. 11, 1995 [JP] Japan .................................. 7-205670

[51] Int. Cl.⁶ .............................. B60L 1/02; F21V 33/00; B60Q 7/00
[52] U.S. Cl. .............................. 219/202; 362/94; 315/84
[58] Field of Search .............................. 219/202, 205, 219/220; 362/32, 92, 93, 94, 83.3, 61, 71, 155, 23, 29, 30, 31; 313/32, 495; 315/84, 115

[56] References Cited

U.S. PATENT DOCUMENTS

| | | | |
|---|---|---|---|
| 2,953,009 | 9/1960 | Sharpe | 362/94 |
| 4,123,668 | 10/1978 | Pecota | 315/84 |
| 4,475,067 | 10/1984 | Rowe | 315/84 |
| 4,872,095 | 10/1989 | Dubak et al. | 362/155 |
| 5,047,388 | 9/1991 | Alten | 315/84 |
| 5,079,681 | 1/1992 | Baba et al. | 362/263 |
| 5,189,340 | 2/1993 | Ikeda | 315/115 |
| 5,408,162 | 4/1995 | Williams | 315/224 |
| 5,568,018 | 10/1996 | Muzic | 315/276 |

FOREIGN PATENT DOCUMENTS

| | | |
|---|---|---|
| 64-059330 | 3/1989 | Japan . |
| 2-080916 | 3/1990 | Japan . |

OTHER PUBLICATIONS

US Patent Application No. 08/552,575.

*Primary Examiner*—Mark H. Paschall
*Assistant Examiner*—Sam Paik
*Attorney, Agent, or Firm*—Pillsbury Madison & Sutro LLP

[57] ABSTRACT

A preheating device for an illuminating unit comprises a cold cathode fluorescent tube, a heater for heating the cold cathode fluorescent tube at the time of low temperature and ensuring the brightness, a temperature sensor, a door-unlocking detector, and a CPU controlling the heater. When a driver of a vehicle unlocks a door of a vehicle with a key to get it in, the door-unlocking detector detects unlocking of the door and sends the detected signal to the CPU. The CPU starts electric supply to the heater to preheat the cold cathode fluorescent tube when a detected signal of the unlocking of the door is input by the door-unlocking detector and a cold temperature signal is input by the temperature sensor.

11 Claims, 5 Drawing Sheets

PREHEATING DEVICE OF ILLUMINATING UNIT FOR VEHICLE

CROSS REFERENCE TO RELATED APPLICATION

This application is based upon and claims priority of Japanese Patent Application No. Hei 7-205670 filed on Aug. 11, 1995, the contents of which are incorporated herein by reference.

BACKGROUND OF THE INVENTION

1. Field of the Invention

The present invention relates to a preheating device of an illuminating unit for illuminating indicators and displays used for instruments for a vehicle.

2. Description of Related Art

According to Japanese Patent Laid-Open Publication No. Hei 2-80916, an illuminating unit for illuminating the instrument panel, letters and numerals by a cold cathode fluorescent lamp has been known. The instrument panel is made of a smokey light shielding film or the like except the indicating portions and the cold cathode fluorescent tube is disposed at the back of the instrument panel.

However, when such an illuminating unit is employed for instruments of a vehicle when the outside temperature is very low at a severely cold time, the temperature of the cold cathode fluorescent tube of the illuminating unit is also low, resulting in poor illuminating efficiency inside the fluorescent tube and in an insufficient brightness.

Therefore, a heater is disposed around the cold cathode fluorescent tube to heat the cold cathode fluorescent tube when the temperature is very low, thereby preventing deterioration of the brightness.

In case such an illuminating unit is employed for a vehicle, the illuminating unit is heated by the heater at a low temperature when the ignition key switch is turned on. However, a certain time is necessary until the temperature rises, a driver has to wait until a sufficient brightness is obtained.

SUMMARY OF THE INVENTION

In light of the above-described problem, the present invention has a main object of providing a preheating device of an illuminating unit having a cold cathode fluorescent tube which ensures sufficient brightness even at a very low temperature.

To achieve the aforementioned object, the preheating device comprises means for detecting unlocking of a door and means for controlling an electric supply to the heater of the cold cathode fluorescent tube when the door-unlocking is detected.

In the above-descried preheating device, the current supply controlling means stops current supply to the heater if the ignition switch is not turned on in a certain period of time after starting of the electric supply to the heater.

The preheating device also has a light-source (or cold cathode fluorescent tube) temperature detector.

In the preheating device of an illuminating unit for a vehicle constructed as the above, when a driver of a vehicle unlocks the door with a key to get in the vehicle, the door-unlocking detecting means outputs the detected signal. The current supply controlling means controls the heater to heat the fluorescent tube when a door-unlocking signal is sent from the door-unlocking detecting means.

In this way, electricity is supplied to the heater when a driver unlocks the door before turning on the ignition switch. Therefore, when the driver turns on the ignition switch to start the vehicle, the light source is in a state of substantially a high temperature, so that the light source can light with sufficient brightness enabling to illuminate and indicate the instruments effectively.

Other objects and features of the invention will appear in the course of the description thereof, which follows.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PREFERRED EMBODIMENTS

A preferred embodiment of the present invention is hereinafter described with reference to the accompanying drawings.

A cold cathode fluorescent tube 3 is connected to a battery B through an inverter 6 and a power switching circuit 5.

Figure 1:
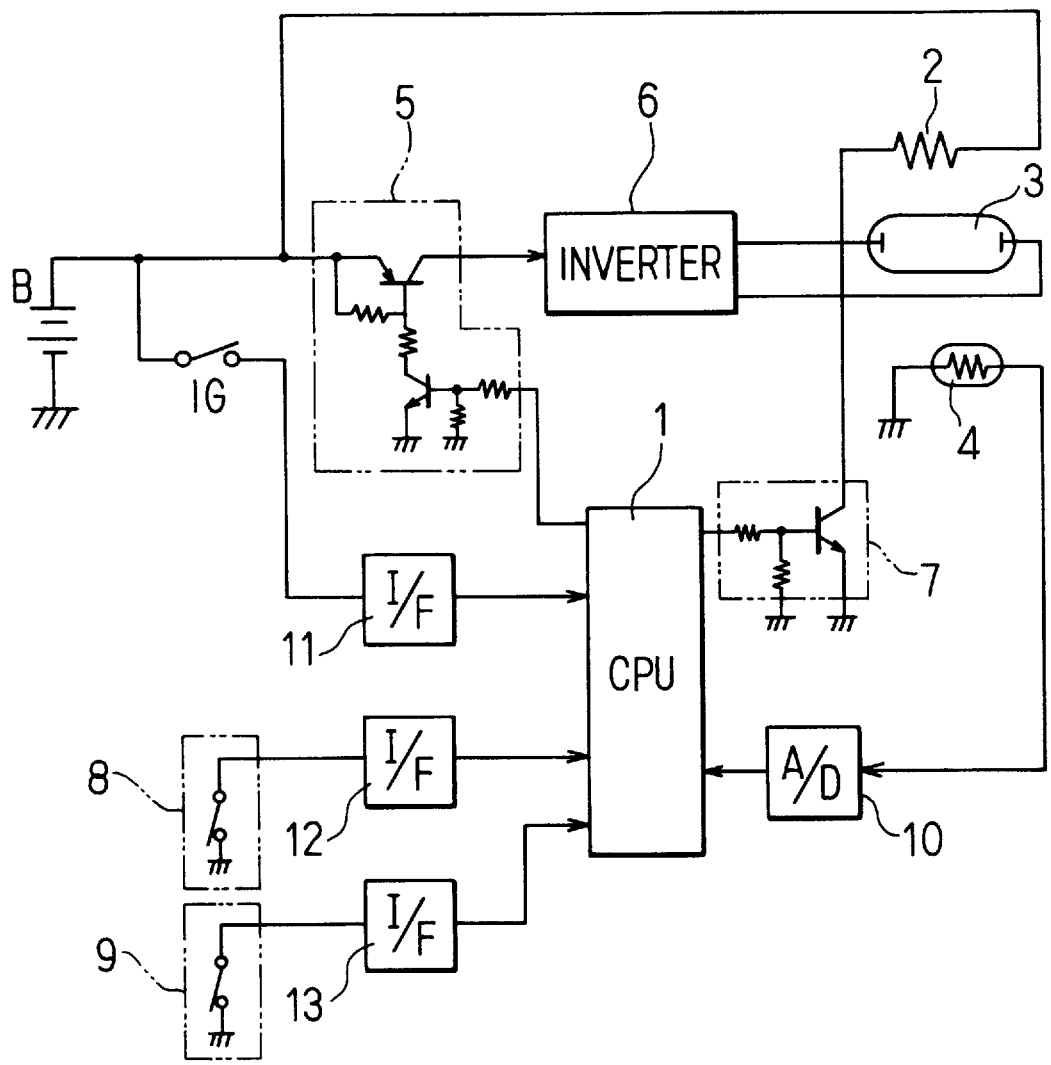
FIG. 1 is a circuit diagram of a preheating device according to an embodiment of the present invention.
Figure 2:
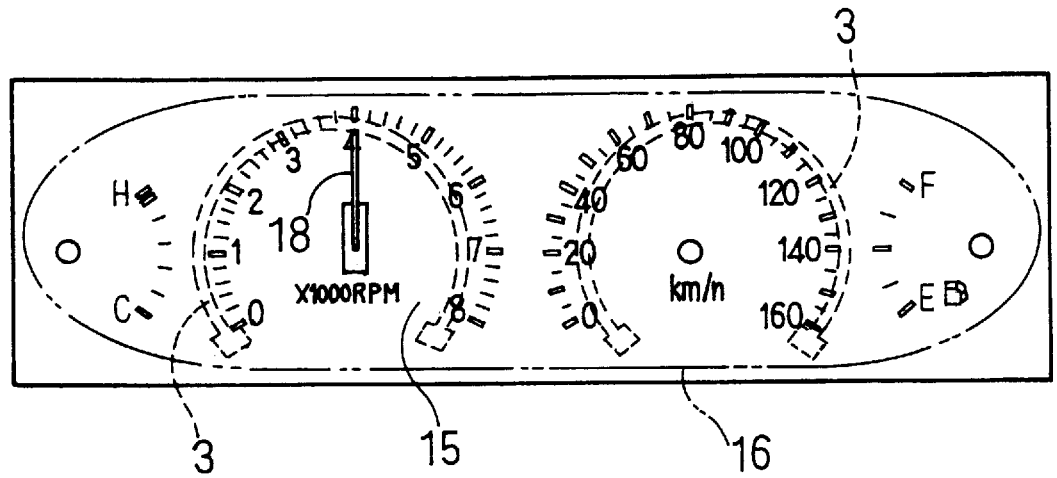
FIG. 2 is a front view of an instrument.
Figure 3:
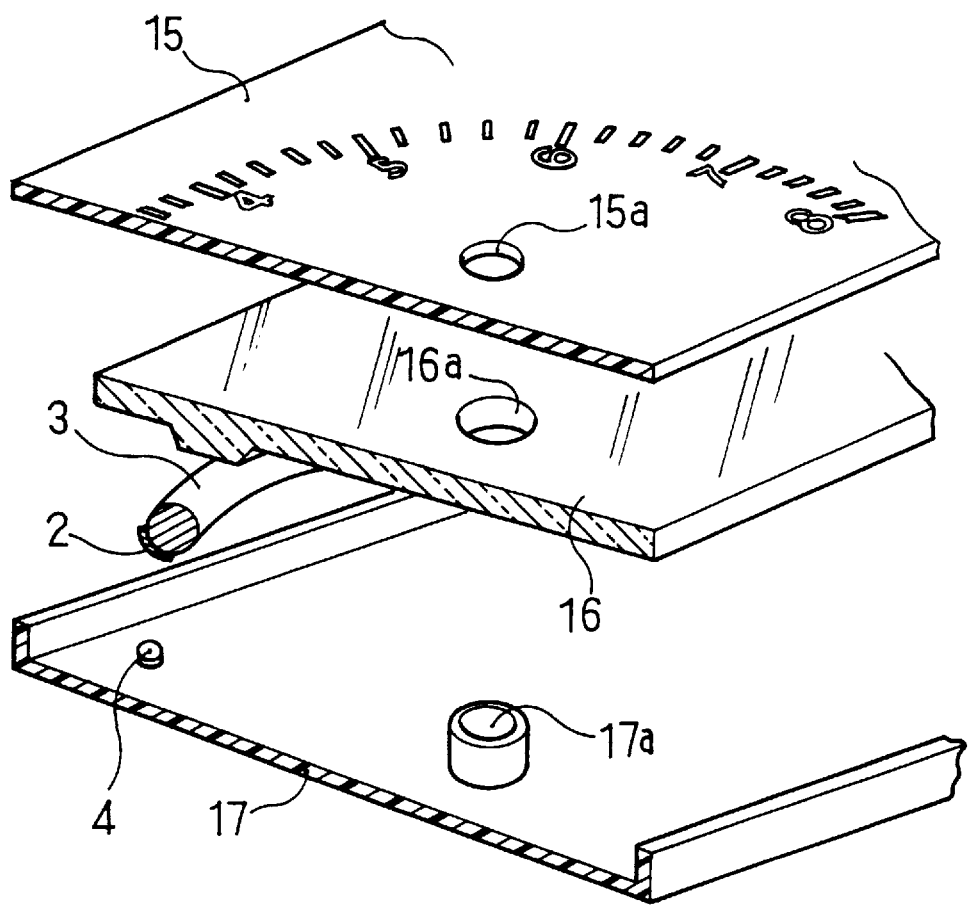
FIG. 3 is a fragmentary exploded view of the instruments shown in FIG. 2.

The cold cathode fluorescent tube 3 is formed into the shape of a substantial horseshoe as shown in FIGS. 2 and 3. A heater 2 is disposed on the side of the fluorescent tube 3 at the back of an instrument panel 15 and a light transmitting plate 16 along the graduation portions.

The instrument panel 15 is made of a smokey light shielding film or the like which is formed on a transparent resin sheet except the indicating portions including the graduations, letters, numerals, or the like so that the graduations are illuminated by the light from the transmitting plate 16.

The instrument panel 15 is fixed on a case 17 via the light transmitting plate 16. A pointer shaft (not shown) extends upward from an interior device (not shown) disposed inside the case 17 into holes 15a, 16a, and 17a of the instrument panel 15, the light transmitting plate 16 and the case 17. A pointer 18 is fixed at the edge of the pointer shaft.

Figure 4:
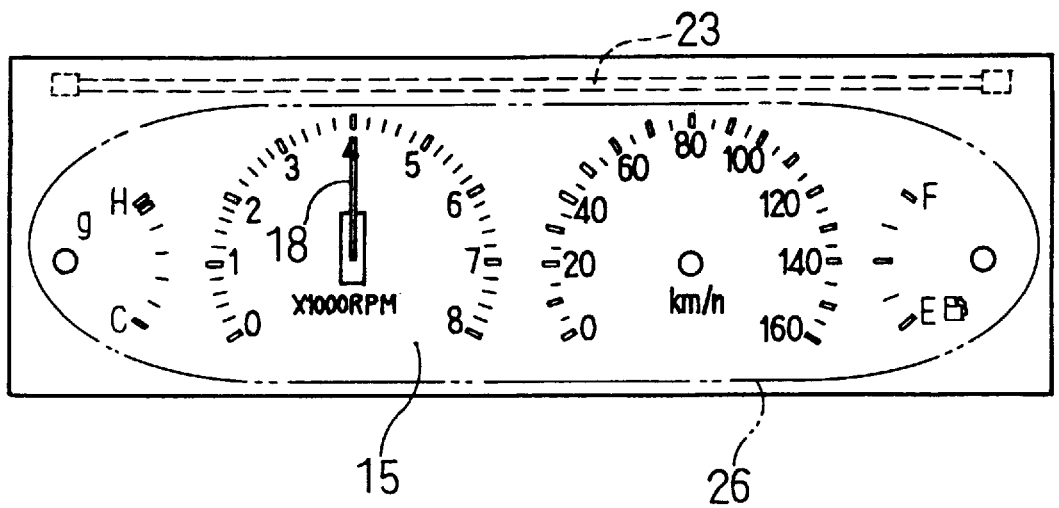
FIG. 4 is a front view of another instrument.
Figure 5:
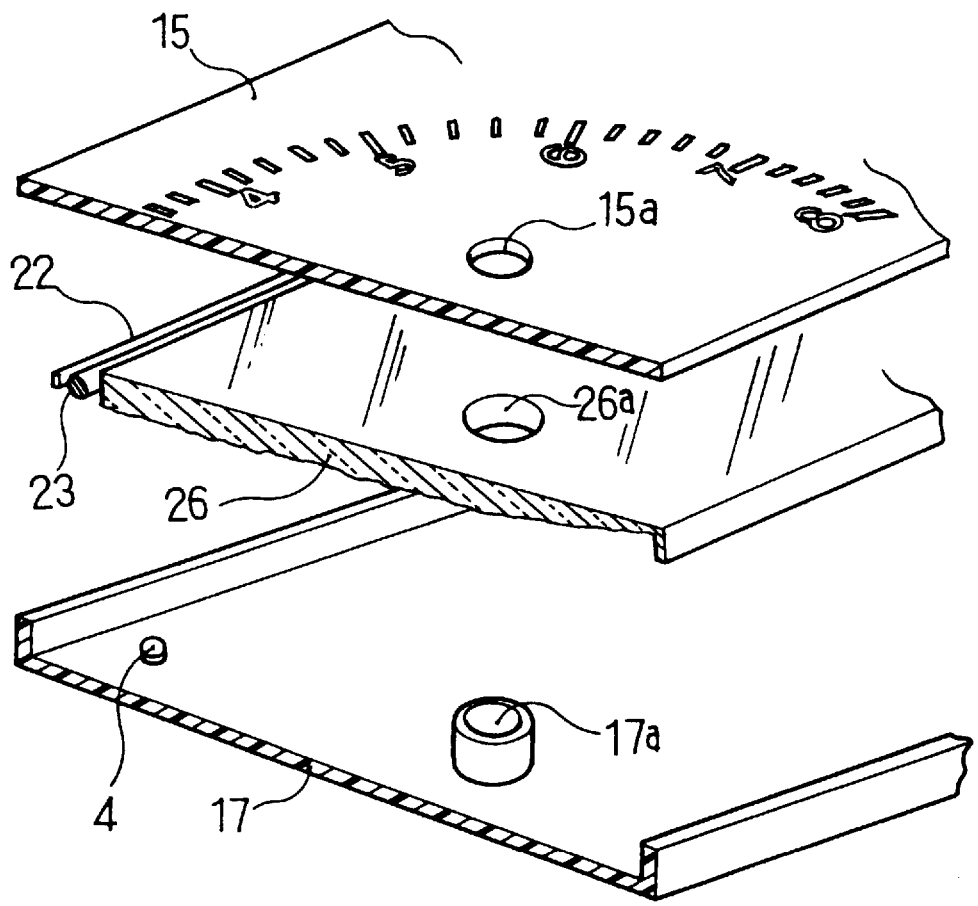
FIG. 5 is a fragmentary exploded view of the instruments shown in FIG. 4.

As shown in FIGS. 4 and 5, a straight cold cathode fluorescent tube 23 can be provided in place of the fluorescent tube 3, In this case, the fluorescent tube 23 is disposed along an edge of a light transmitting plate 26 disposed at the back of the instrument panel 15. A heater 22 is disposed longitudinally along the cold cathode fluorescent tube 23. The heater can be spirally mounted around the fluorescent tube 23.

A thermistor 4 is disposed for detecting its temperature in the vicinity of the heater 2. The heater 2 is connected to the positive and the negative terminals of the battery B through a heater switching circuit 7. The inverter 6 converts the direct current to alternating current.

The thermistor 4 is connected to the input circuit of a CPU 1 through an A/D converter 10. The control side of the switching circuit 7 of the heater 2 and the switching circuit 5 of the cold cathode fluorescent tube 3 are connected to the output circuit of the CPU 1.

A door-opening detector 8 detects the opening of a door of a vehicle and a door-unlocking detector 9 detects the unlocking of the door-locking mechanism. They are connected to the input circuit of the CPU 1 through interfaces 12 and 13 respectively. An ignition switch IG is also connected to the input circuit of the CPU 1 through an interface 11 to detect for detecting switch-on or switch-off of the ignition switch IG.

The door-opening detector 8 sends a one-shot signal to the CPU 1 when the door is opened by a driver. The door-unlocking detector 9 sends a one-shot signal to the CPU 1 when the door is unlocked.

The CPU 1 is a one-chip CPU including an input/output circuit, memory, or the like. The CPU 1 controls the current supply to the heater 2 of the cold cathode fluorescent tube 3 based on a programmed data stored inside the fixed memory in advance when the temperature is very low and the door opening or unlocking is detected.

Figure 6:
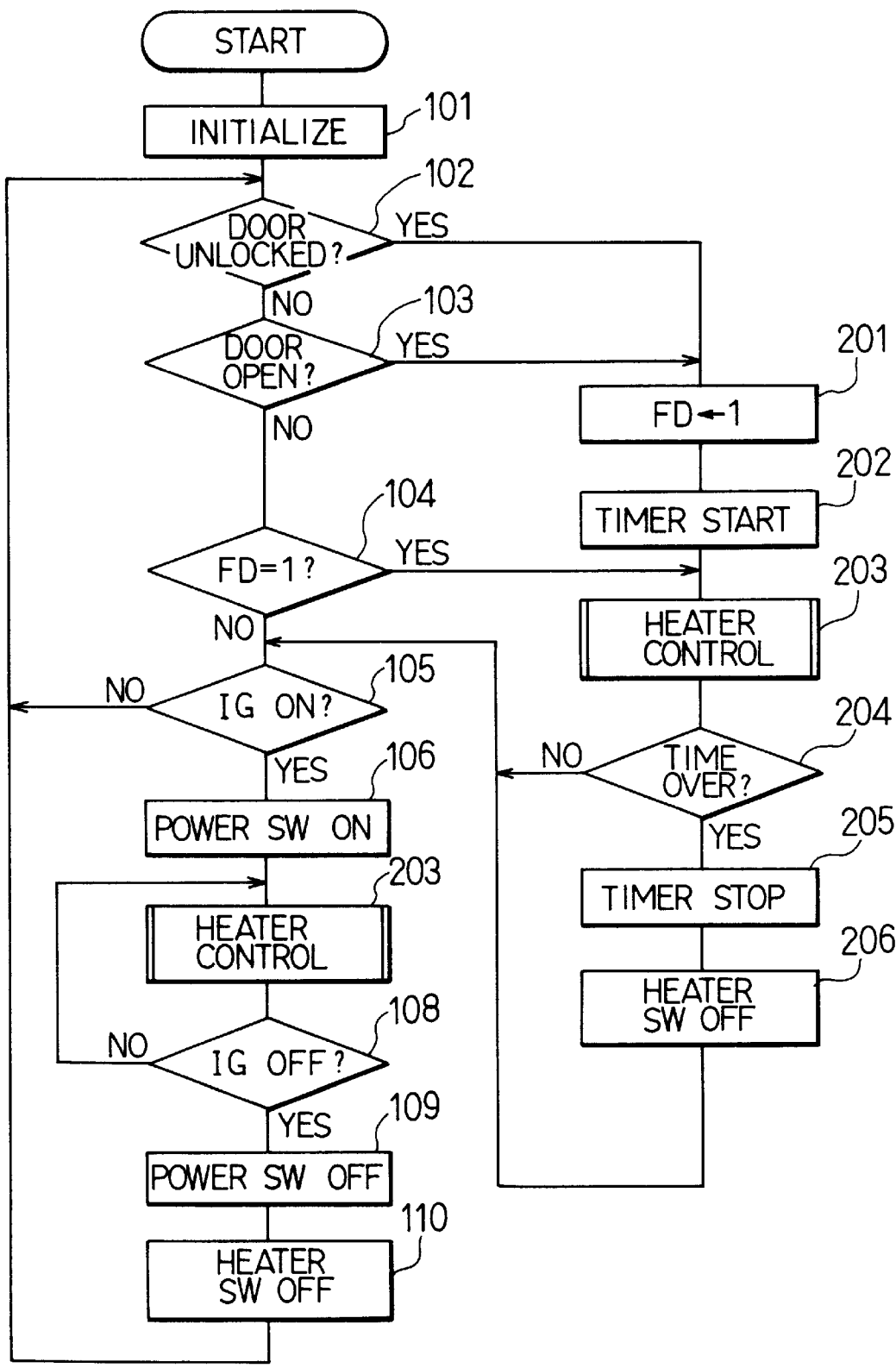
FIG. 6 is a flow chart showing an operation of an illuminating unit and a preheating device according to an embodiment of the present invention.

The operation of the preheating device of the above-described structure is hereinafter explained with reference to the flow charts of FIGS. 6 and 7.

After initializing at step 101, the CPU 1 judges whether a door of a vehicle is unlocked or not at step 102, and judges whether the door of the vehicle is opened or not at step 103. The unlocking of the door is judged when a signal is sent from the door-unlocking detector 9, the opening of the door is judged when a signal is sent from the door-opening detector 8.

In this case, the CPU 1 proceeds from the step 102 or 103 to step 201 to set a flag FD, then, a timer, such as a soft ware timer, starts at step 202 and the heater 2 is controlled at step 203 to run the heater 2 for a suitable time (e.g., 2 minutes).

Figure 7:
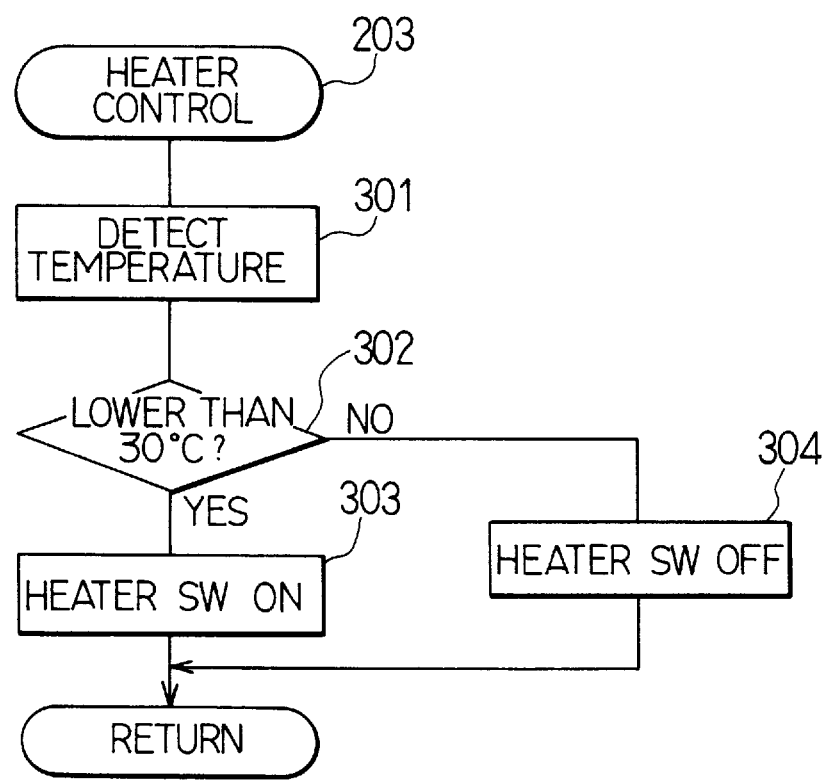
FIG. 7 is a flow chart of heater control according to an embodiment of the present invention.

When the CPU 1 performs heater control, as shown in FIG. 7, it first reads a temperature-signal indicating the temperature of the cold cathode fluorescent tube 3 at step 301, then, judges whether the temperature of the fluorescent tube 3 is below a preset temperature (e.g., 30° C.) at step 302. When the detected temperature of the fluorescent tube 3 is below the preset temperature, the CPU 1 proceeds to step 303 to turn on the switching circuit 7 to supply electricity to the heater 2 and heats the fluorescent tube 3. On the other hand, when the detected temperature of the cold cathode fluorescent tube 3 is above the set temperature, it proceeds to step 304 to turn off the switching circuit 7 to cut off the current supply to the heater 2.

Thus, in case the cold cathode fluorescent tube 3 is below 30° C., electricity is immediately supplied to the heater 2 to heat the fluorescent tube 3 so that the temperature of the tube reaches 30° C. when the door is unlocked or opened.

Following the step 203 of heater control, the CPU 1 performs step 204 and judges whether the counted value of the timer reaches a preset time (e.g., 2 minutes) or not. Before the set time is over, it judges whether the ignition switch IG is off at step 105, and then goes back to the aforementioned step 102 and performs the steps following the step 102 until the step 203 to continue heating control operation of the heater 2.

When the set time (e.g., 2 minutes) elapses, it proceeds from the step 204 to the step 205, and the timer stops counting and, thereafter, the switching circuit 7 stops the electric supply to the heater 2 in step 206.

However, when a driver turns on the ignition switch IG before the set time (2 minutes) of the timer elapses after unlocking or opening the door, the process proceeds from the step 105 to the step 106. The CPU 1 turns on the power source switch circuit 5 to light the cold cathode fluorescent tube 3. In addition, the CPU 1 controls the heater 2 at the step 203 as the same manner in the above. When the temperature of the cold cathode fluorescent tube 3 is below 30° C. of the set temperature, the CPU 1 heats and controls the heater 2.

In this way, electric current is supplied to the heater 2 at low temperature when a driver unlocks the door or opens the door before turning on the ignition switch IG in order to start raising the temperature of the cold cathode fluorescent tube 3. Therefore when the driver turns on the ignition switch IG to start the vehicle, the cold cathode fluorescent tube 3 is in a state of substantially a high temperature, so that the cold cathode fluorescent tube 3 can light with sufficient brightness enabling to illuminate and indicate the instruments effectively.

When the ignition switch IG is turned off, the CPU 1 proceeds from the step 108 to the step 109 to control to turn off the power source switch circuit 5 and to turn off the cold cathode fluorescent tube 3. At the same time, it turns off the switch circuit 7 at the step 110 to cut off the electric supply to the heater 2.

By the way, the above-described embodiment explains a preheating device of an illuminating unit for instruments, however, the present invention can be applied to a preheating device of a back light of an indicator of a liquid crystal display unit or the like.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A preheated illuminating unit for a vehicle, comprising:
   a battery;
   a light source for producing illumination, said light source having a temperature-dependent illuminating efficiency such that said light source produces illumination below a desired level when said light source is below a specific temperature;
   a heater for heating said light source to a temperature above the specific temperature;
   first means for detecting operation of a door of the vehicle; and
   second means connected between said battery and said heater and operatively associated with said first means for supplying heating current to said heater in response to a door operation detection by said first means.

2. The illuminating unit as claimed in claim 1, wherein said first means detects unlocking of said door.

3. The illuminating unit as claimed in claim 1, wherein said first means detects opening of said door.

4. The illuminating unit as claimed in claim 1 wherein said light source comprises a cold cathode fluorescent tube.

5. The illuminating unit as claimed in claim 1 wherein, said second means stops said electric current supply to said heater if said ignition switch is not turned on in a certain period of time after said electric current supply is started.

6. The illuminating unit for a vehicle as claimed in claim 1 further comprising a temperature sensor for detecting temperature of said light source wherein said second means supplies a controlled electric current when said operation of a door is detected in case said temperature of said light source is below the specific temperature.

7. The illuminating unit as claimed in claim 1 further comprising an ignition switch for starting an engine of the vehicle and third means for detecting switch-on of said ignition switch, wherein said light source is disposed to illuminate an instrument panel after said ignition switch is turned on.

8. The illuminating unit as claimed in claim 7, wherein said light source is disposed to conduct light through a light transmitting plate to an instrument panel of the vehicle.

9. The illuminating unit as claimed in claim 8, wherein said light source is straight and is disposed along a side of the light transmitting plate.

10. The illuminating unit as claimed in claim 1, wherein said light source is disposed to conduct light through a light transmitting plate to an instrument panel of the vehicle.

11. The illuminating unit as claimed in claim 1, wherein said second means supply current to only said heater.

* * * * *